Sept. 9, 1969   H. STANTON, JR   3,465,433
CORE WINDING ARBOR AND METHOD
Filed Dec. 30, 1965

INVENTOR.
Howard Stanton, Jr.
BY
Roberts, Cushman + Grover
ATT'Y

United States Patent Office
3,465,433
Patented Sept. 9, 1969

3,465,433
CORE WINDING ARBOR AND METHOD
Howard Stanton, Jr., Ipswich, Mass., assignor to Sylvania Electric Products Inc., a corporation of Delaware
Filed Dec. 30, 1965, Ser. No. 517,581
Int. Cl. H01f 7/06
U.S. Cl. 29—605                                    1 Claim

ABSTRACT OF THE DISCLOSURE

An arbor for precision winding of wire coils having end walls supporting two collapsible core blocks coated with a yielding plastic material which receives an impression of the first layer of wire turns wound on the core and holds the turns of the first layer at a predetermined spacing while superimposed layers of wire turns are wound over the inner layer at the same spacing as the turns of the inner layer.

---

A typical coil winding arbor comprises end walls at each end of a core upon which the coil is wound, the width of the blocks between the end walls and the outside or peripheral surfaces of the blocks defining a volume about which the coil is wound, this volume being the window through the coil and around the central axis of the coil when the arbor is removed. Previously the arbors used for precision winding have consisted of two steel core blocks adapted to be held in place by the end walls and machined to the required dimensions of the coil to be wound thereon. For precision winding, parallel grooves were cut in two or more edges of each of the arbor core blocks for the purpose of locating and holding the initial turns of wire wound on the core in parallelism and at a desired spacing. The grooves in such blocks were necessarily preformed with respect to the diameter of the wire used in the coils and the number of turns axially of the coil. Considerable skilled labor and time were needed to cut the grooves in the steel blocks, and a large and expensive inventory of grooved blocks were necessary to accommodate the various sizes of coils and wires.

The object of the present invention is to provide arbor cores which do not require machining prior to the winding of the coils and which may be reused for winding coils of the same coil size and the same or a different wire size.

According to the invention an arbor for the precision winding of a coil in superimposed layers of wire turns comprises an arbor core having peripheral faces defining a volume and a rotational axis therethrough around which the turns are wound, said core including a body of yielding plastic material extending entirely across at least one face of the core parallel to said axis, said body facing the inner layer of wire turns plastically to conform thereto when the inner layer is initially wound on the body, thereby positively to hold the turns of said inner and superimposed layers at the same spacing as the initial spacing of the turns of the inner layer.

For the purpose of illustration typical embodiments of the invention are shown in the accompanying drawing, in which.

Figure 1:
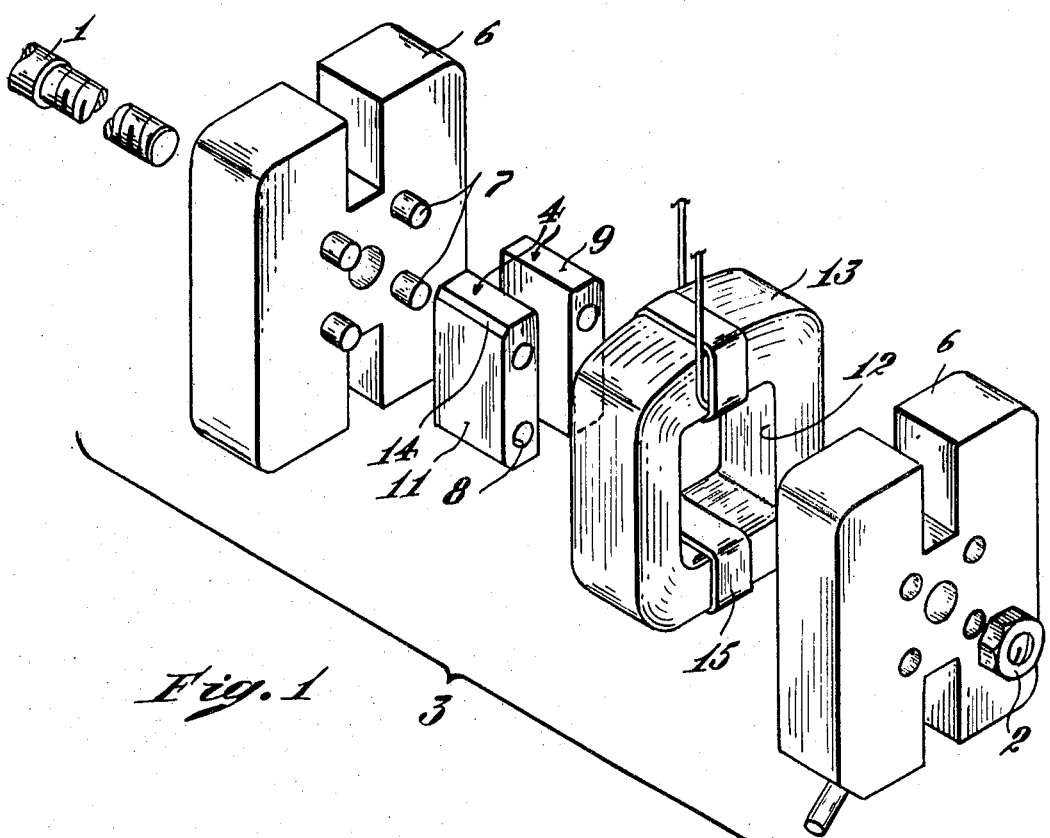
FIG. 1 is an exploded isometric view of a coil winding arbor including core blocks according to the invention.

As shown in FIG. 1 a spindle 1 has a threaded end adapted to receive a nut 2 after the threaded end of the spindle 1 is extended through an arbor 3. The arbor comprises two core blocks 4 which are adapted to be confined between end walls 6. The end walls 6 have studs 7 which fit in holes 8 so as to position the core blocks 4. So positioned, the outside or peripheral surfaces 9 and 11 of the core blocks define a solid generally rectangular volume within the peripheral surfaces, which volume has the desired dimensions of the window 12 of the coil 13 which is to be wound upon the core blocks about the volume and its central axis which is coincident with that of the spindle 1.

In use the arbor is assembled on the spindle with the end walls 6 serving to define the width or axial extent of the coil 13, and the spindle is rotated so as to draw wire from a supply spool (not shown) and wind successive layers of wire turns upon the core 4 between the walls 6. It is customary to form a beveled edge 14 between the main peripheral surfaces 9 and 11 of the core blocks. After the coil is wound the ends are secured by tapes 15, the arbor is removed from the spindle and the core blocks are separated from the end walls to permit their collapse and removal from the coil window.

According to the invention one of the peripheral surfaces 9 and 11, and the beveled edge 14 is provided with a smooth-surfaced body of yielding plastic material 16 such as Teflon, nylon, Mylar, polyethylene, polyurethane, polyvinylchloride, epoxy or Silastic or like plastic, high molecular weight synthetic organic resins. Any one of these plastic resins suitably plasticized is capable of temporary or permanent indentation by the wire turns wound over them.

Figure 2:
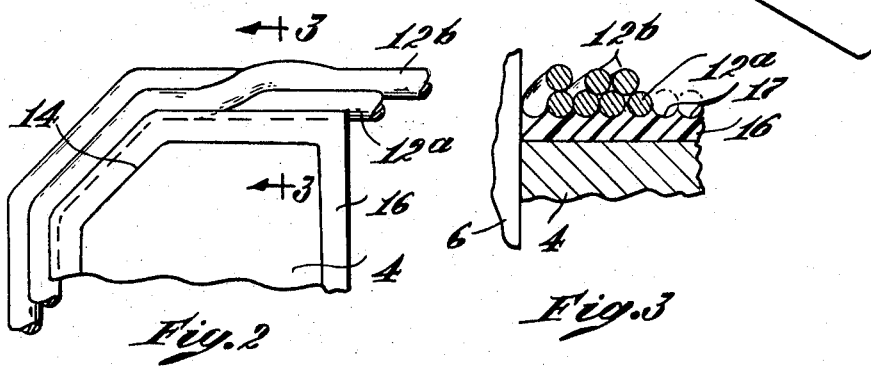
FIG. 2 is a side elevation, partly broken away, of the core block shown in FIG. 1.
Figure 3:
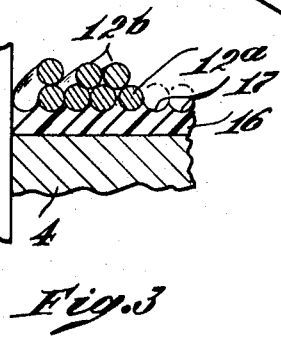
FIG. 3 is a section on line 3—3 of the core block of FIG. 2.

For example, one or all of the peripheral surfaces 9, 11 and 14 of each core block may be spray or dip coated with Teflon to a thickness dependent upon the gauge of the wire to be wound thereon, approximately one-quarter to one-half the diameter of the wire. For example, a thickness of 0.020 inch is suitable for a wire of gauge 0.050 inch, or a thickness of 0.032 inch for a wire of gauge 0.090 inch. As shown in FIGS. 2 and 3, the plastic coating 16 is of such plasticity as to yield sufficiently to receive an impression of the turns of wire 12 as they are wound on the arbor. It is necessary to apply sufficient tension to the wire as the first layer is wound on the arbor to force it to form grooved indentations 17 in the plastic coating 16. Also the first layer is preferably wound relatively slowly with the degree of precision necessary to provide a predetermined, uniform wire spacing. Thereby the wire effectively cuts its own positioning grooves which then hold the turns of wire at the desired center to center spacing, usually, but not necessarily, with adjacent turns in lateral contact. As the winding of the first or inner layer proceeds turns wound are held in position without lateral shifting. Further, the second layer of turns wound in superimposition over the inner layer is held in the recesses between adjacent inner turns, and does not disturb the inner turns seated in the self-formed grooves.

By varying the resin the grooves may be formed temporarily or permanently. A plastic such as pure polyurethane or low density polyethane is said to have an inherent memory characteristic which causes it to return to its original shape after the deforming force of the wires is released. Such a plastic may be used again for winding wire of a different gauge. On the other hand, plastic such as pure Teflon or an elastomer such as Silastic will retain the set of the first winding after the coil is removed from the core, and may be used to wind other coils of the same wire gauge and pitch.

Figure 4:
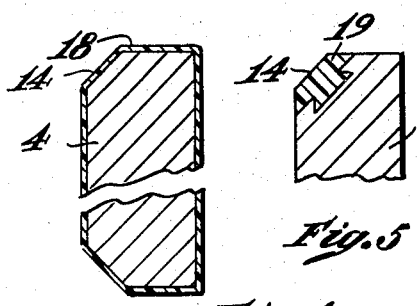
FIGS. 4 to 6 are sections, like FIG. 2, showing other forms of core blocks according to the invention.

Instead of dip or spray coating the plastic, it may be applied as a tape or sleeve 18 as shown in FIG. 4. Pressure sensitive tape having a plastic base may be wound wholly around the peripheral and inner faces of the core 4 as shown, or only over the peripheral faces 9, 11 and 14. Or a thermo-shrinkable plastic tube or sleeve of Teflon or polyvinylchloride, radiated with cobalt 90 or other high energy, may be shrink-fitted by heat in the position shown in FIG. 4.

Figures 5, 6:

Instead of a thin film, blocks of plastic may be set in the core blocks 4 at the beveled edge 14. The plastic blocks extend entirely across the beveled edge. In FIG. 5, such a plastic block 19 is devetailed in the core block. In FIG. 6 the plastic block 20 is secured by a screw 21 extending through the core block into the plastic block.

In each of the forms shown in FIGS. 1 to 6 the plastic body is located at a peripheral surface of the core block, preferably at or including the beveled edge 14 so as to deform and conform to the inner layer of wire coil turns so as to positively hold both the inner layer of turns and subsequent superimposed layers.

While certain desirable embodiments of the invention have herein been illustrated and described, it is to be understood that these are mainly by way of example, and the invention is broadly inclusive of any and all modifications falling within the scope of the appended claim.

I claim:

1. The method of precision winding superimposed layers of wire turns upon collapsible arbor core members, comprising disposing a body of yielding plastic material across at least one face of the core, winding a first inner layer of wire turns on the core and body with adjacent wires uniformly spaced less than two wire diameters from center to center of the wire turns, winding successive layers of wire turns over said inner layer, and during said inner layer winding stressing the wire by tension sufficient to form grooves in said body complementary to the opposing wire turns, thereby positively to hold the turns of said inner and superimposed layers at said uniform spacing, collapsing said core members and removing them from the superimposed layers of wire turns allowing the plastic to return to its original condition, and winding other successive layers of wire turns.

References Cited

UNITED STATES PATENTS

| | | | |
|---|---|---|---|
| 2,428,826 | 10/1947 | Bauer | 242—118.4 X |
| 3,108,763 | 10/1963 | Ahlene | 242—118.4 X |
| 2,974,400 | 3/1961 | Sowa | 29—630 |
| 3,034,743 | 5/1962 | Hill | 242—118.32 |
| 3,150,844 | 9/1964 | Le Bas | 242—118.4 X |
| 3,201,849 | 8/1965 | Voss | 29—605 X |
| 3,207,394 | 9/1965 | Claridge | 242—118.7 |

JOHN F. CAMPBELL, Primary Examiner

C. E. HALL, Assistant Examiner

U.S. Cl. X.R.

242—118.2